(12) United States Patent
Kosaka (10) Patent No.: US 7,541,550 B2
(45) Date of Patent: Jun. 2, 2009

(54) TURN SIGNAL SWITCH DEVICE

(75) Inventor: Ken Kosaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/017,512

(22) Filed: Jan. 22, 2008

(65) Prior Publication Data

US 2008/0185269 A1 Aug. 7, 2008

(30) Foreign Application Priority Data

Feb. 2, 2007 (JP) ............................. 2007-024279

(51) Int. Cl.
 *H01H 3/16* (2006.01)
(52) U.S. Cl. ................................. 200/61.27; 200/61.54
(58) Field of Classification Search ............... 200/61.27
See application file for complete search history.

(56) References Cited

U.S. PATENT DOCUMENTS

| 4,315,117 | A  | * | 2/1982 | Kokubu et al. | ............ | 200/61.27 |
| 6,194,676 | B1 | * | 2/2001 | Takahashi et al. | ........ | 200/61.34 |
| 7,038,580 | B2 | * | 5/2006 | Takahashi | ................... | 340/475 |
| 7,385,152 | B2 | * | 6/2008 | Hasch et al. | ............. | 200/61.27 |

FOREIGN PATENT DOCUMENTS

| JP | 2001-006495 | 1/2001 |
| JP | 2006-221933 | 8/2006 |

* cited by examiner

*Primary Examiner*—Elvin G Enad
*Assistant Examiner*—Lheiren Mae A Anglo
(74) *Attorney, Agent, or Firm*—Brinks Hofer Gilson & Lione (57) ABSTRACT

A turn signal switch device comprises a control lever that has a lever portion that projects from a base portion that has a shaft hole, and a shaft that has a head disposed at one end. The head has a larger diameter than that of the other portion of the shaft, and is inserted into the shaft hole so as to serve as a rotating shaft of the control lever. The device also comprises a holder that is formed of synthetic resin, has an opening into which the base portion is inserted, and supports the shaft such that the control lever can be tilted along one plane. The device further comprises a case that supports the holder such that the control lever and the holder can be integrally tilted along the other plane which substantially crosses the one plane at right angles. A ring-shaped concave groove that extends in a circumferential direction is provided at the other end of the shaft. A bearing hole with a smaller diameter than that of the head and into which the shaft is inserted is provided in a pair of side plates of the holder that faces each other. A flexible engagement piece that extends inwardly in a radial direction of the bearing hole so as to be engaged with the ring-shaped groove is provided in one of the pair of side plates.

6 Claims, 11 Drawing Sheets

TURN SIGNAL SWITCH DEVICE

CLAIM FOR PRIORITY

This application claims the benefit of Japanese Patent Application No. 2007-024279, filed on Feb. 2, 2007, the entire contents of which is hereby incorporated by reference.

FIELD

The present invention relates to a turn signal switch device which is provided in a steering column or the like of a vehicle so as to be used as a direction indicator.

BACKGROUND

In a turn signal switch device of vehicles, a base portion of a control lever is supported by a holder so as to be tilted along one plane, and the holder is supported by a housing fixed to a steering column or the like so as to be tilted integrally with the control lever along the other plane which substantially crosses the one plane at right angles. Further, when a lever portion of the control lever is tilted to any one of left and right direction indication positions along the other plane from a neutral position, a lamp for left or right turn is switched on and off. When the lever portion of the control lever is tilted along the one plane, a beam switching or passing operation is performed. In such a turn signal switch device, in order for the control lever to smoothly move between the neutral position and the left and right direction indication positions, a spring member and a driving body are interposed between a cam surface provided in the housing side and the holder such that the driving body comes in elastic contact with the cam surface. Similarly, in order for the control lever to smoothly move between a beam switching position or passing position and the neutral position, the spring member and the driving body are also interposed between the cam surface provided in the holder side and the base portion of the control lever such that the driving body comes in elastic contact with the cam surface.

Figure 8:
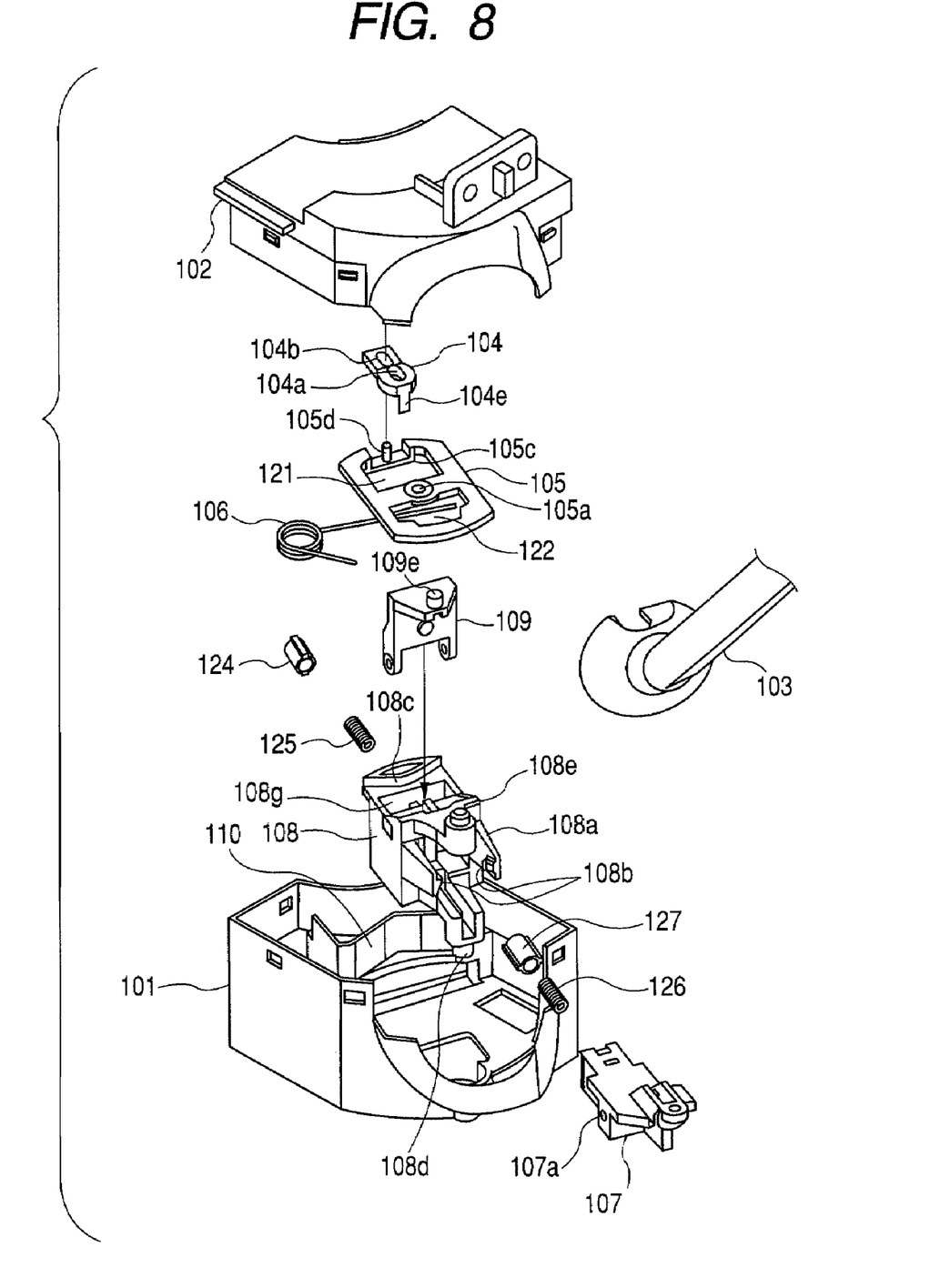
FIG. 8 is an exploded perspective view of a conventional turn signal switch device.
Figure 9:
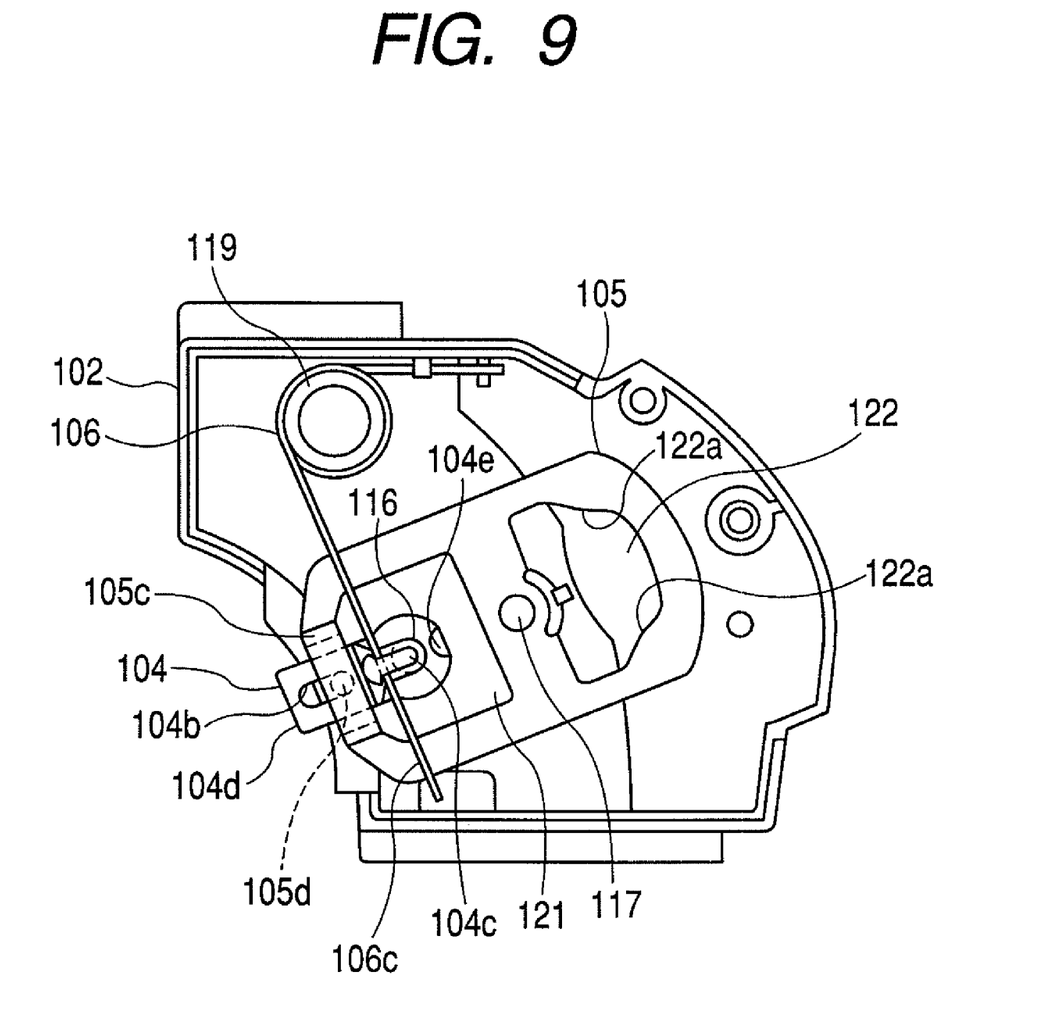
FIG. 9 is a bottom view of a cancel mechanism of the conventional turn signal switch device.
Figure 10A:
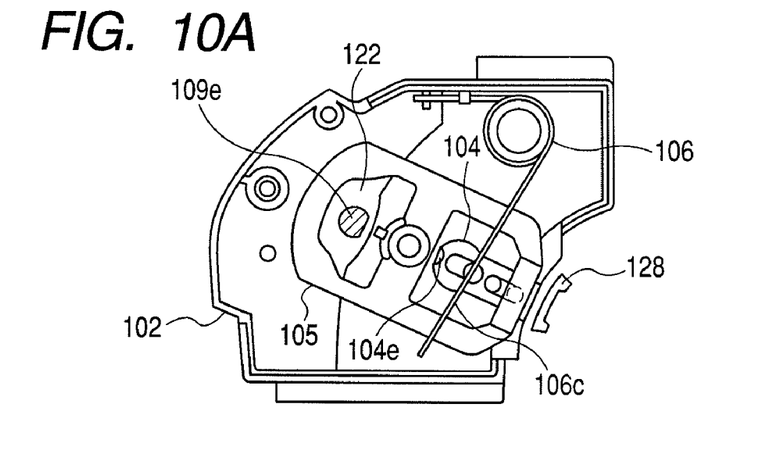
FIGS. 10A to 10C are explanatory views of the operation of the cancel mechanism shown in FIG. 9.
Figure 10B:
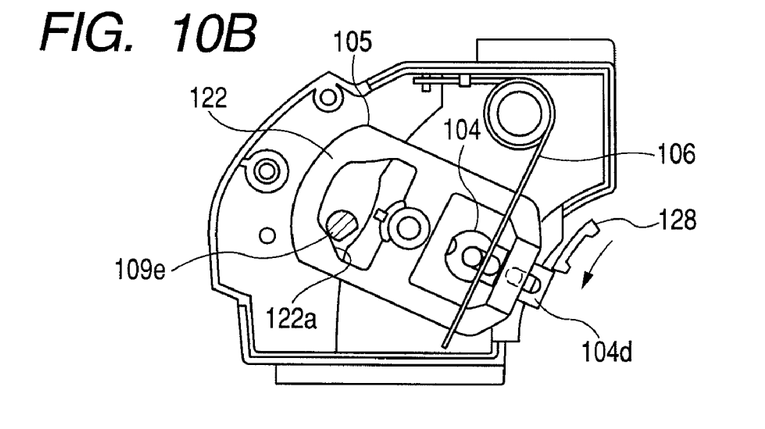
Figure 10C:
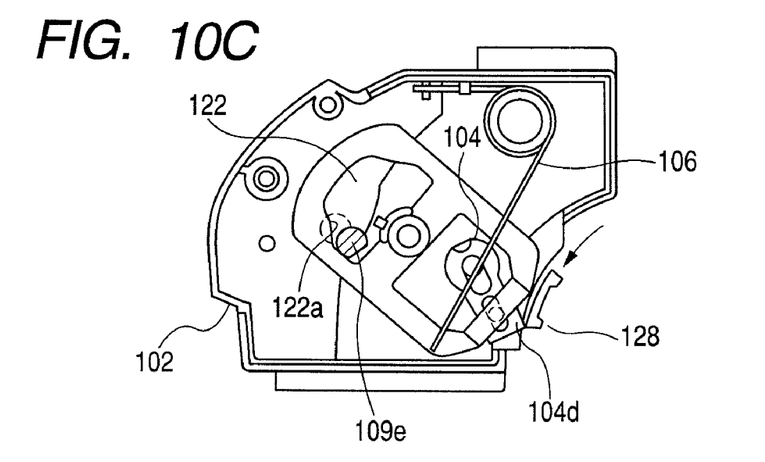

Hereinafter, the structure of a conventional turn signal switch device (for example, refer to Japanese Unexamined Patent Application Publication No. 2001-6495 (Pages 4-7, FIG. 1)) will be described with reference to FIGS. 8 to 10. FIG. 8 is an exploded perspective view of a conventional turn signal switch device. FIG. 9 is a bottom view of a cancel mechanism of the turn signal switch device. FIG. 10 is a diagram for explaining an operation of the cancel mechanism.

In the drawings, the turn signal switch device includes first and second cases 101 and 102 which are formed of synthetic resin and compose a housing, a control lever 103 supported by both of the cases 101 and 102 through a holder 108, first and second lever members 104 and 105 loaded on the inner surface of the second case 102, and a torsion coil spring 106 which elastically biases the first lever member 104 in a direction where the first lever member 104 projects to the outside of the second case 102. However, an operating member 107 is fixed to a base portion of the control lever 103, and a movable member 109 is swingably supported by the holder 108. Further, the first and second cases 101 and 102 are integrated through snapping or the like, and are fixed to a stator member such as a column cover or combination switch (not shown).

The first case 101 has a V-shaped cam surface 110 provided on the inner surface thereof, the cam surface 110 having a valley portion and a lock portion. A first driving body 124, which is held by the holder 108 and is biased by a spring 125, comes in elastic contact with the cam surface 110 so as to slide thereon. Further, a printed board (not shown) is attached on the inner bottom portion of the first case 101, and contact portions for lighting lamps are arranged on the printed board.

On the inner surface of the second case 102, a guide shaft 116 and a support shaft 117 are erected on the same line, and a boss 119 is erected. The guide shaft 116 rotatably and slidably supports the first lever member 104, and the support shaft 117 rotatably supports the second lever member 105. Further, the boss 119 supports the wound portion of the torsion coil spring 106.

The first and second lever members 104 and 105 are connected by engaging a connection pin 105d with a long hole 104b. The first lever member 104 has long holes 104a and 104b and a spring receiving portion 104c provided therein. As the guide shaft 116 is inserted into the long hole 104a, the lever member 104 is rotatably and slidably supported. Further, an abutting portion 104d is provided on one longitudinal end of the first lever member 104, and a cam engagement portion 104e is erected on the other longitudinal end. Meanwhile, the second lever member 105 has first and second openings 121 and 122 and an attachment hole 105a provided therein. As the support shaft 117 is inserted into the attachment hole 105a, the lever member 105 is rotatably supported. Further, a projecting portion 105c and the connection pin 105d are provided at one longitudinal end of the second lever member 105. In a state where the connection pin 105d is inserted into and linked with the long hole 104b, both of the lever members 104 and 105 overlap each other.

The torsion coil spring 106 has an arm portion 106c extending in a cantilever shape, and the arm portion 106c is engaged with the spring receiving portion 104c of the first lever member 104. Therefore, the first lever member 104 is elastically biased in a direction where the abutting portion 104d is pressed outward along the long holes 104a and 104b.

The operating member 107 fixed to the root portion of the control lever 103 forms the base portion of the control lever 103. The operating member 107 is formed of synthetic resin, and a circular concave portion 107a is provided on both side surfaces thereof. Further, the holder 108 has a pair of projection pieces 108a such that the operating member 107 is interposed between the projection pieces 108a, and each of the projection pieces 108a has a cylindrical projection 108b provided on the inner surface thereof. The holder 108 is also formed of synthetic resin. Through snapping where the respective projections 108b are fitted into the circular concave portions 107a, the base portion (operating member 107) of the control lever 103 is supported by the holder 108. At the end of the holder 108 opposite the projection piece 108a, a cam surface 108c is formed. The cam engagement portion 104e of the first lever 104 comes in sliding contact with the cam surface 108c. Although not shown, a separate cam surface is also formed within the holder 108, and a second driving body 127, which is held by the operating member 107 and is biased by a spring 126, comes in elastic contact with the cam surface so as to slide thereon. The holder 108 has a pair of support shafts 108d and 108e projecting thereon. As the support shafts 108d and 108e are fitted into the bearing portions of the first and second cases 101 and 102, the holder 108 is supported by both of the cases 101 and 102. However, the axial direction of the support shafts 108d and 108e is set to substantially cross the axial direction of the protrusion 108b at right angles. Accordingly, with the support shafts 108d and 108e being set to a rotating shaft, the control lever 103 and the operating member 107 can be tilted integrally with the holder 108 along one plane with respect to both of the cases 101 and 102. Further, with the protrusion 108b being set to a rotating shaft, the control lever 103 and the operating member 107 can be tilted along the other plane, which substantially crosses the one plane at right angles, with respect to the holder 108 and both of the cases 101 and 102.

In a state where the movable member 109 is inserted into an opening 108g of the holder 108 and is biased by a spring 125, the movable member 109 is attached to the holder 108 so as to slightly swing. The movable member 109 has a receiving portion 109e projecting thereon, the receiving portion 109e being disposed in the second opening 122 of the second lever member 105. The receiving portion 109e is disposed in a curved edge 122a of the second opening 122.

Now, an operation of the conventional turn signal switch device constructed in such a manner will be described. First, when the control lever 103 is located at a neutral position, the first driving body 124 comes in elastic contact with the valley portion of the cam surface 110. Therefore, the control lever 103 is held at the neutral position. At this time, the cam engagement portion 104e of the first lever member 104 is abutted on the top portion of the cam surface 108c of the holder 108 such that the position thereof is restricted. Therefore, as shown in FIG. 10A, the first lever member 104 is held within the second case 102 against the biasing force of the torsion coil spring 106. Further, the abutting portion 104d is positioned outside a rotational locus of the cancel projection 128 which is rotated with a steering wheel of a vehicle.

When the control lever 103 located at the neutral position is tilted to any one of left and right direction indication positions with the support shafts 108d and 108e set to a rotating shaft, the first driving body 124 slides on the cam surface 110 so as to generate click feeling and is then held by the lock portion. Further, the holder 108 and the movable member 109 are rotated at a predetermined angle in the same direction such that the top portion of the cam surface 108c is separated from the cam engagement portion 104e. Further, as shown in FIG. 10B, the first lever member 104 is moved toward the one longitudinal end by the biasing force of the torsion coil spring 106, and the abutting portion 104d enters the rotational locus of the cancel projection 128. In this state, since a steering wheel is rotationally controlled in the same direction as the tilt direction of the control lever 103, the cancel projection 128 can be abutted on the abutting portion 104d in the reverse direction to an arrow direction of FIG. 10B. However, although the cancel projection 128 is abutted in this direction such that the first and second lever members 104 and 105 rotates in the counterclockwise direction, the torque is not transmitted to the receiving portion 109e of the movable member 109. Therefore, when the cancel projection 128 passes, both of the lever members 104 and 105 returns to the state of FIG. 10B due to the biasing force of the torsion coil spring 106.

In this state, however, when the steering wheel is rotationally controlled in the reverse direction to the tilt direction of the control lever 103, the cancel protrusion 128 is abutted on the abutting portion 104d in the arrow direction of FIG. 10B. Therefore, the first and second lever members 104 and 105 are rotated in the clockwise direction. That is, since the first lever member 104 is rotationally driven in the clockwise direction about the guide shaft 116, the second lever member 105 is rotated with the rotation of the first lever member 104, and the curved edge 122a of the second opening 122 pushes the receiving portion 109e of the movable member 109 upward in the drawing. Since the pushing force is transmitted to the holder 108 from the movable member 109, the first driving body 124 is separated from the lock portion of the cam surface 110 so as to be pushed back to the valley portion. Further, both of the lever members 104 and 105 automatically return to the neutral position shown in FIG. 10A.

In the state of FIG. 10B, when any force preventing the automatic return acts on the control lever 103, for example, when the steering wheel is rotationally controlled in the reverse direction to the tilt direction while the control lever 103 is pushed by the hand, the receiving portion 109e is pressed along the curved edge 122a by a divided force of the torque of the second lever member 105, as shown in FIG. 10C. Therefore, the movable member 109 slightly swings with respect to the holder 108, against the biasing force of the spring 125. Further, the first and second lever members 104 and 105 can be rotated without being hindered by the receiving portion 109e.

Meanwhile, when the control lever 103 located at the neutral position is tilted with the protrusion 108b set to a rotating shaft, the operating member 107 forming the base portion of the control lever 103 is rotated at a predetermined angle in the same direction with respect to the holder 108. Therefore, the second driving body 127 slides on a cam surface (not shown) formed in the holder 108. As a result, when the control lever 103 is tilted in one direction, click feeling is generated, so that a beam switching operation is performed. Alternately, when the control lever 103 is tilted in the reverse direction, a passing operation is performed.

Figure 11:
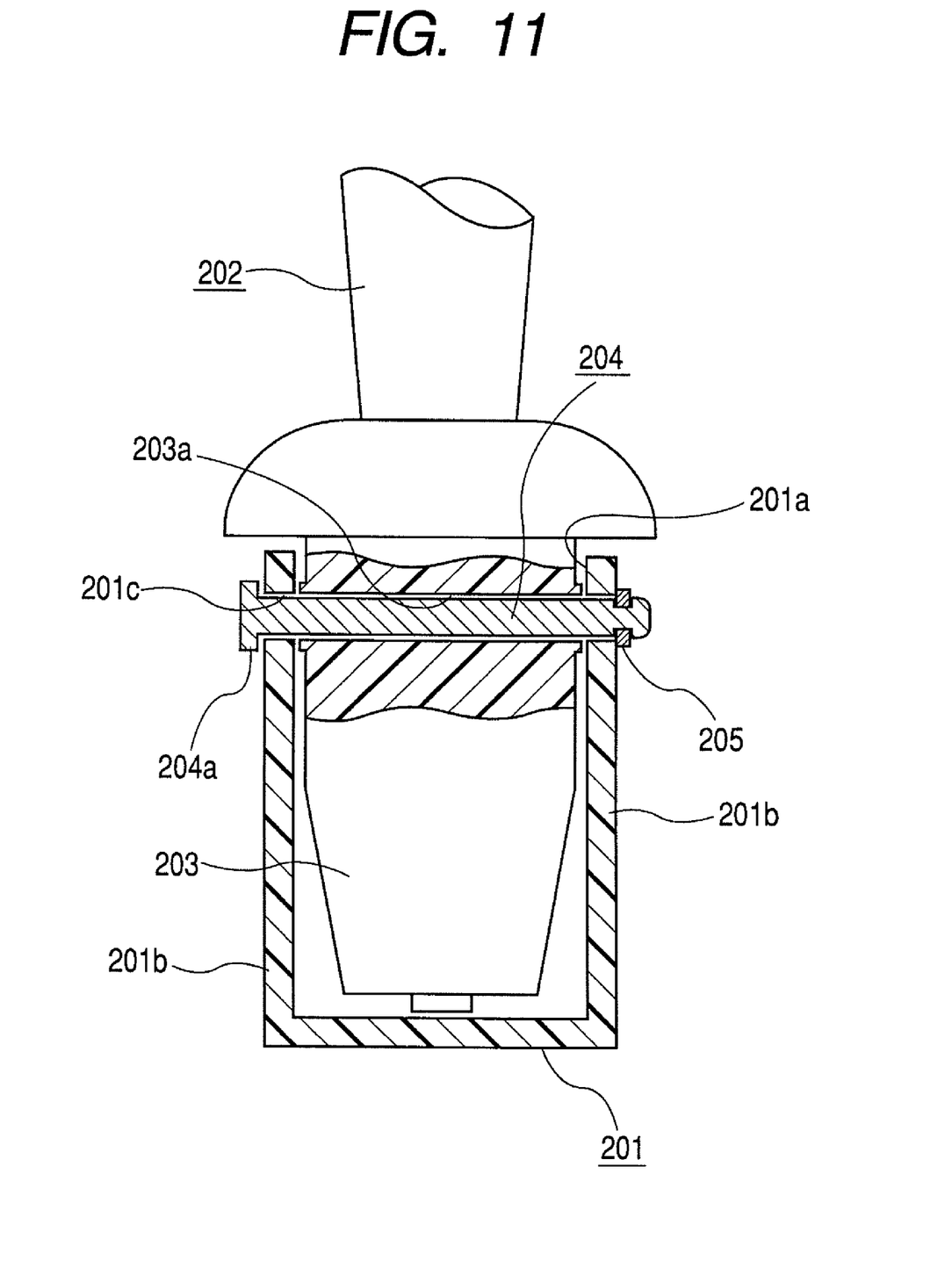
FIG. 11 is an explanatory view illustrating a connection structure between the base portion of a control lever and a holder in another conventional turn signal switch device.

FIG. 11 shows another conventional turn signal switch device. In the conventional turn signal switch device shown in FIG. 11, a holder 201 supported by a case (not shown) and a base portion 203 of a control lever 202 are rotatably connected to each other by using a shaft 204 and a retaining member 205 (for example, refer to Japanese Unexamined Patent Application Publication No. 2006-221933(Pages 6-12, FIG. 2)). In the conventional turn signal switch device, the base portion 203 of the control lever 202 is inserted into an opening 201a of the holder 201, and the shaft 204 with excellent rigidity is inserted into a shaft hole 203a provided in the base portion 203 and a bearing hole 201c provided in a pair of side plates 201b of the holder 201 facing each other through the opening 201a. Then, the retaining member 205 such as a washer or the like is fitted into one end of the shaft 204. The other end of the shaft 204 is formed with a head 204a having a larger diameter than those of the shaft hole 203a and the bearing hole 201c. Therefore, as the head 204a and the retaining member 205 are positioned outside the side plates 201b of the holder 201, the base portion 203 of the control lever 202 can be reliably connected to the holder 201, with the shaft 204 being set to a rotating shaft.

However, in the conventional turn signal switch device disclosed in Japanese Unexamined Patent Application Publication No. 2001-6495, the holder 108 supported by the first and second cases 101 and 102 and the operating member 107 forming the base portion of the control lever 103 are rotatably connected to each other through the snapping in which the protrusion 108b of the holder 108 is fitted into the circular concave portion 107a of the operating member 107. Therefore, there are difficulties in increasing connection strength between the holder 108 and the operating member 107. That is, to improve control feeling during the tilting of the control lever 103, the springs 125 and 126 which cause the first and second driving bodies 124 and 127 to come in elastic contact with the respective cam surfaces need to generate a predetermined elastic repulsive force such that the control lever 103 does not lack an operation force. However, when the elastic repulsive force generated by the springs 125 and 126 is large, the projection 108b of the holder 108 is easily separated from the circular concave portion 107a of the operating member 107 by the reaction force.

In the conventional turn signal switch device disclosed in Japanese Unexamined Patent Application Publication No.

2006-221933, the holder 201 supported by the case and the base portion 203 of the control lever 202 are rotatably connected to each other by using the shaft 204 and the retaining member 205. Therefore, although the operating force of the control lever 202 is strengthened, it is not likely that the connection strength between the holder 201 and the base portion 203 is insufficient. However, since two members such as the shaft 204 and the retaining member 205 should be added, the number of components increases. Further, since the retaining member 205 such as a washer should be fitted into one end of the shaft 204, an assembling property is degraded.

The present invention has been finalized in view of the drawbacks inherent in the conventional antenna, and it is an object of the present invention to provide a turn signal switch device, in which although an operation force of a control lever is set to predetermined strength, a base portion of the control lever is not separated from a holder, an assembling property is excellent, and the number of components is prevented from increasing.

SUMMARY

According to an aspect, a turn signal switch device comprises a control lever that has a lever portion that projects from a base portion that has a shaft hole, and a shaft that has a head disposed at one end. The head has a larger diameter than that of the other portion of the shaft, and is inserted into the shaft hole so as to serve as a rotating shaft of the control lever. The device also comprises a holder that is formed of synthetic resin, has an opening into which the base portion is inserted, and supports the shaft such that the control lever can be tilted along one plane. The device further comprises a case that supports the holder such that the control lever and the holder can be integrally tilted along the other plane which substantially crosses the one plane at right angles. A ring-shaped concave groove that extends in a circumferential direction is provided at the other end of the shaft. A bearing hole with a smaller diameter than that of the head and into which the shaft is inserted is provided in a pair of side plates of the holder that faces each other. A flexible engagement piece that extends inwardly in a radial direction of the bearing hole so as to be engaged with the ring-shaped groove is provided in one of the pair of side plates.

DETAILED DESCRIPTION

Figure 1:
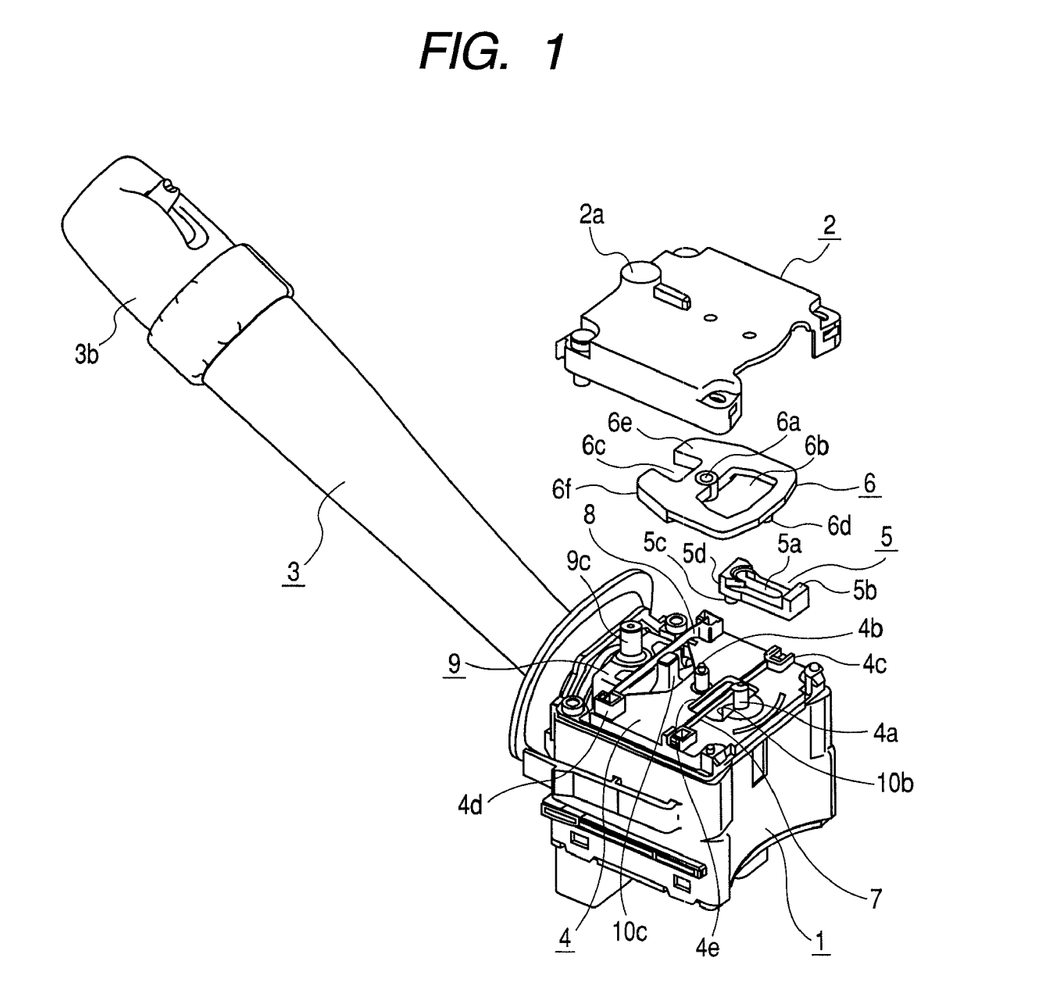
FIG. 1 is a partially-exploded external view of a turn signal switching device according to an embodiment.
Figure 2:
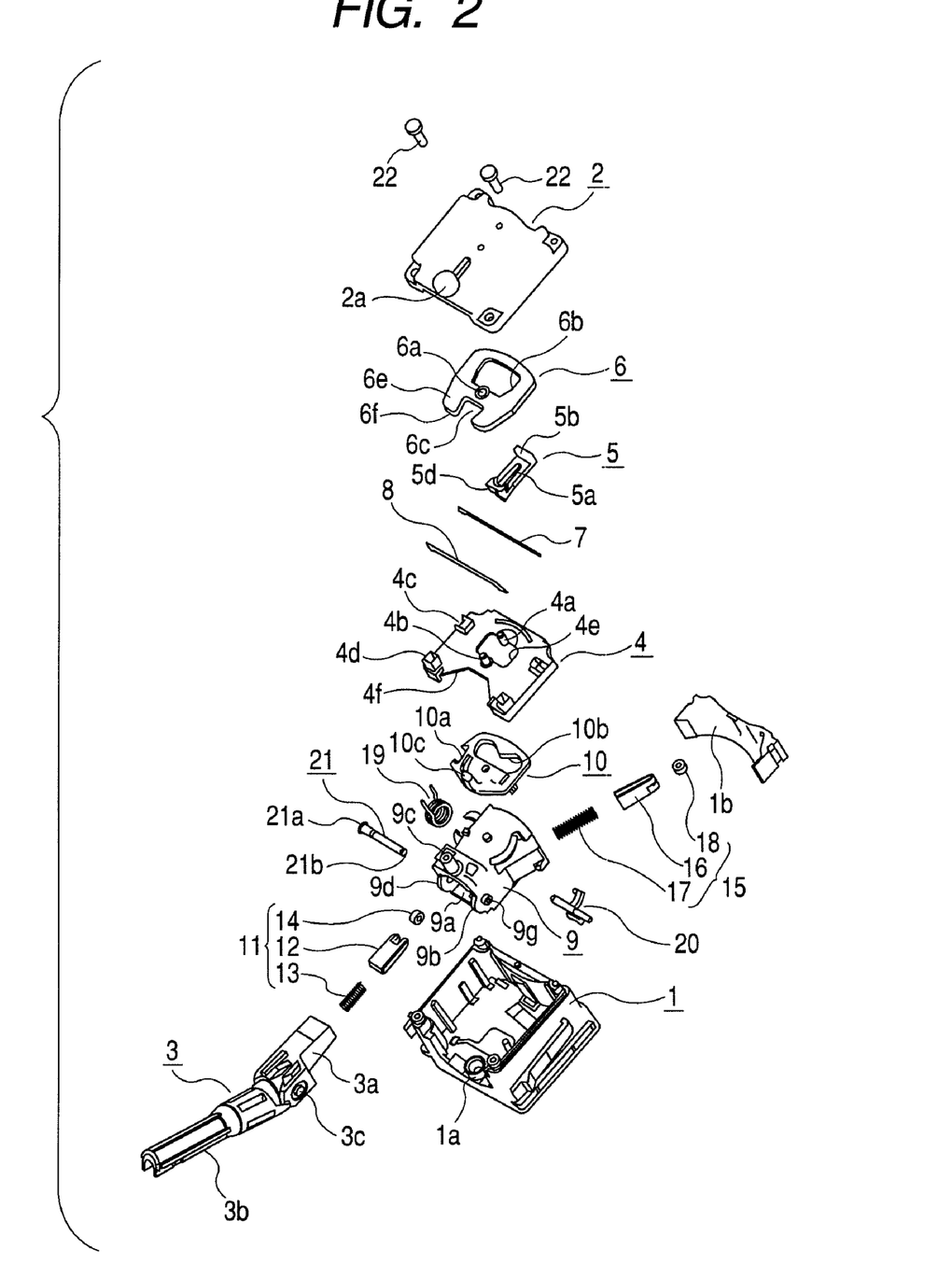
FIG. 2 is an exploded perspective view of the turn signal switching device.
Figure 3:
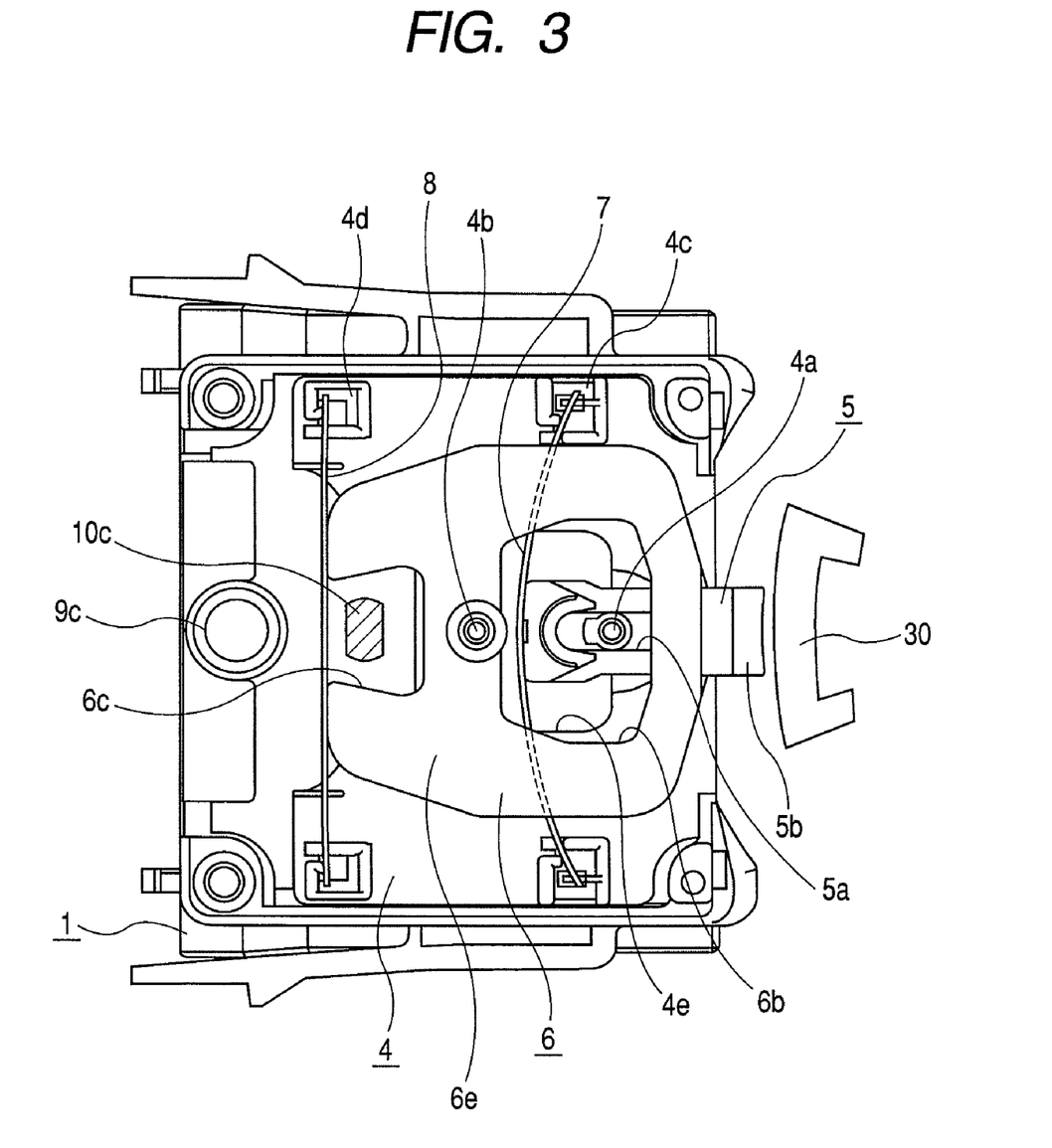
FIG. 3 is an explanatory view illustrating a state where a control lever is located at a neutral position in a cancel mechanism of the turn signal switching device.
Figure 4:
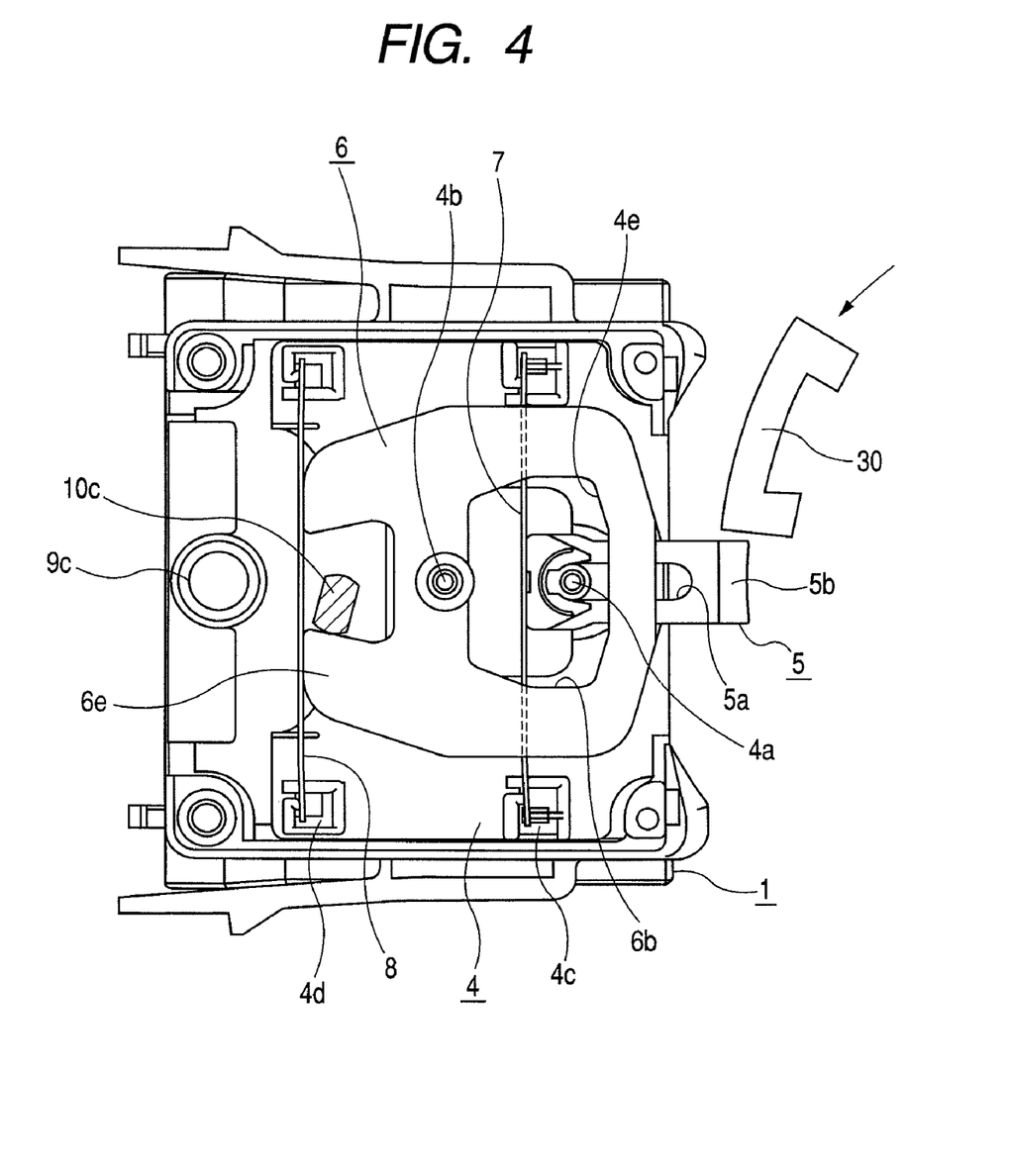
FIG. 4 is an explanatory view illustrating a state immediately before the control lever automatically returns in the cancel mechanism.
Figure 5:
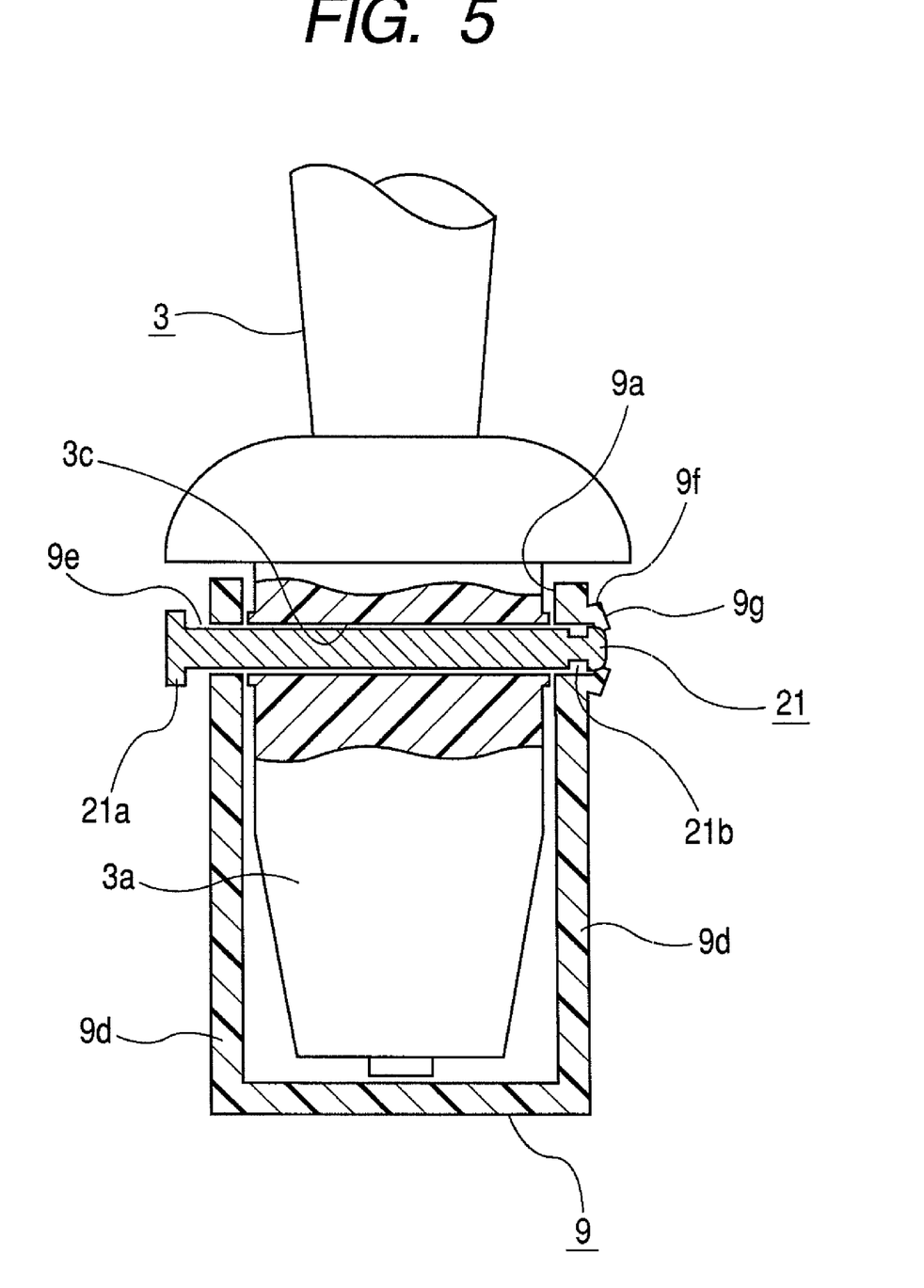
FIG. 5 is an explanatory view illustrating a shaft attachment operation for connecting a base portion of the control lever to a holder.
Figure 6:
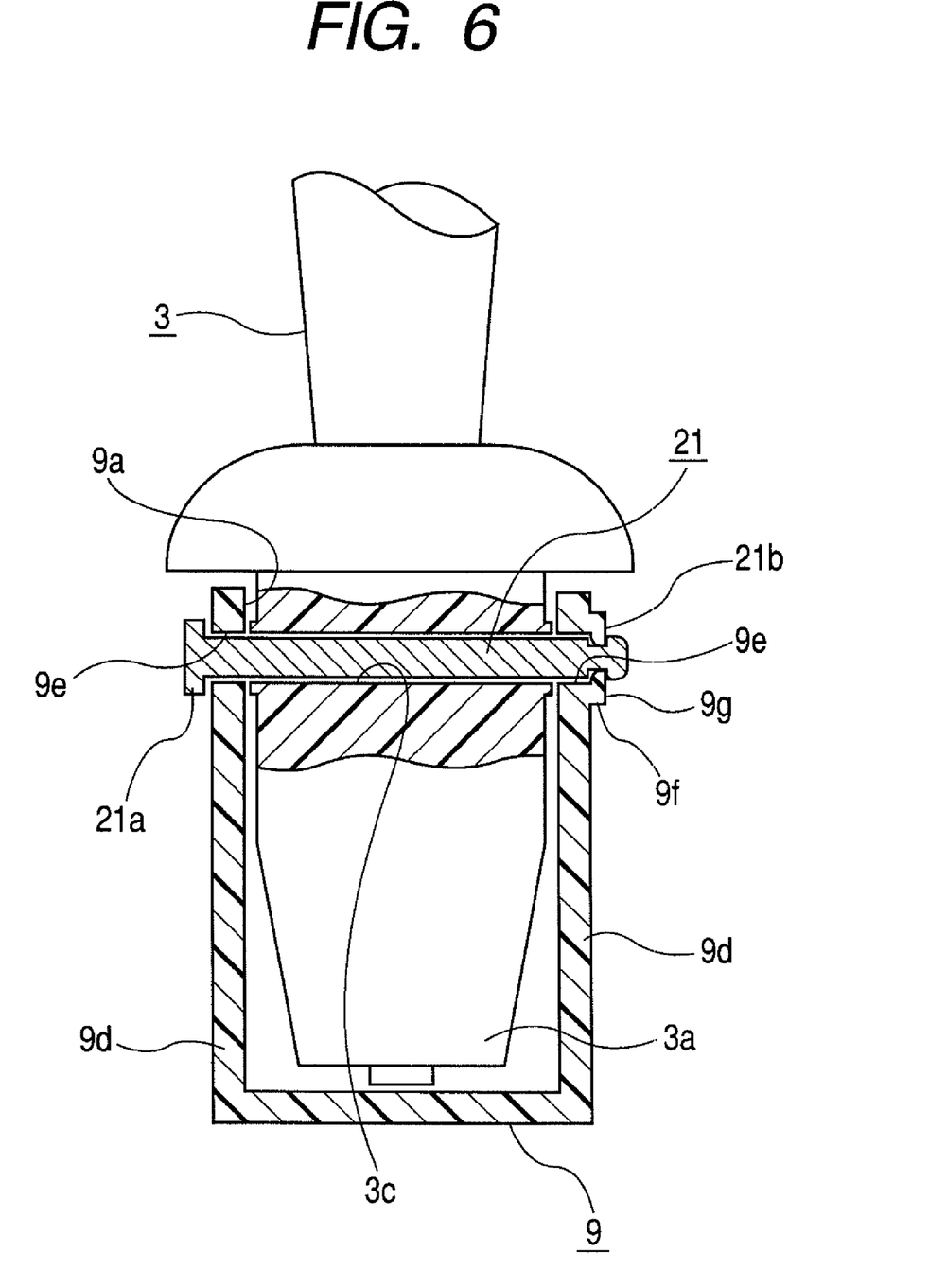
FIG. 6 is an explanatory view illustrating a state where the shaft attachment operation is completed.
Figure 7:
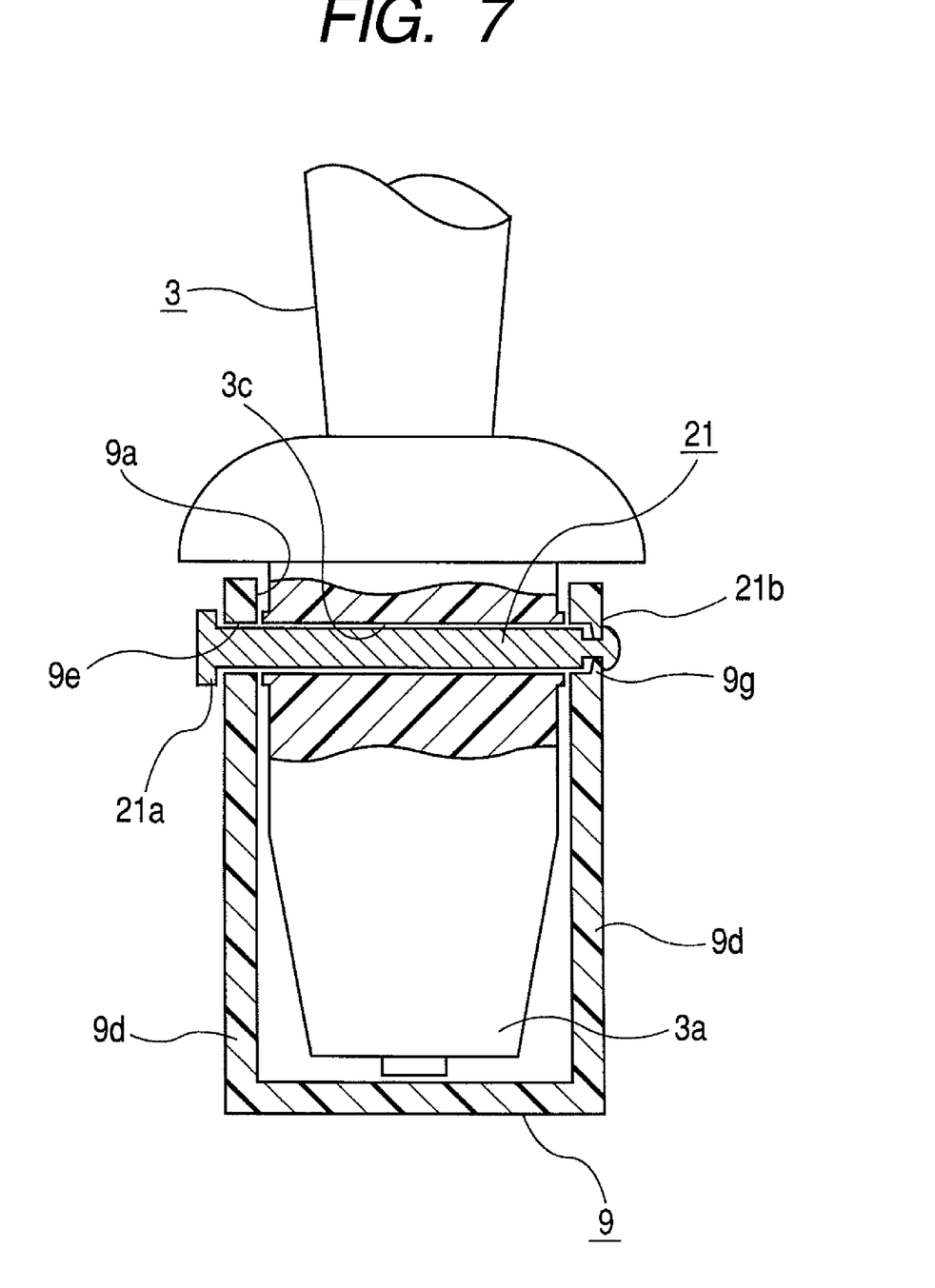
FIG. 7 is an explanatory view illustrating a modification of the holder shown in FIG. 6.

Embodiments of the present invention will now be described with reference to the drawings. FIG. 1 is a partially-exploded external view of a turn signal switching device according to an embodiment. FIG. 2 is an exploded perspective view of the turn signal switching device. FIG. 3 is an explanatory view illustrating a state where a control lever is located at a neutral position in a cancel mechanism of the turn signal switching device. FIG. 4 is an explanatory view illustrating a state immediately before the control lever automatically returns in the cancel mechanism. FIG. 5 is an explanatory view illustrating a shaft attachment operation for connecting a base portion of the control lever to a holder. FIG. 6 is an explanatory view illustrating a state where the shaft attachment operation is completed. FIG. 7 is an explanatory view illustrating a modification of the holder shown in FIG. 6.

The turn signal switching device shown in the drawings mainly includes first and second cases 1 and 2 composing a housing, a control lever 3 supported by both of the cases 1 and 2 through a holder 9, an intermediate support member 4 fixed between the first and second cases 1 and 2, first and second lever members 5 and 6 which are rotatably supported by the intermediate support member 4, a first elastic member 7 which elastically biases the first lever member 5 in a direction where the first lever member 5 projects to the outside of the second case 2, and a second elastic member 8 for returning the second lever member 6 to the neutral position. The holder 9 swingably supports a movable member 10. Further, the first and second cases 1 and 2 are integrated through snapping or the like so as to be fixed to a stator member such as a column cover or combination switch (not shown).

The first case 1 has a cam portion 1b provided therein, and the leading end of a second operating member 15 held by the holder 9 comes in elastic contact with the cam potion 1b so as to slide thereon. Further, a printed board (not shown) is attached on the inner bottom portion of the first case 1, and contact portions for lighting lamps are arranged on the printed circuit board. The first and second cases 1 and 2 have cylindrical bearing portions 1a and 2a provided in positions facing each other, respectively. As support shafts 9b and 9c of the holder 9 are inserted into the bearing portions 1a and 2a, the holder 9 is supported by both of the cases 1 and 2.

The intermediate support member 4 is formed of synthetic resin and is disposed between the first and second cases 1 and 2 so as to partition the inner space of the housing. The intermediate support member 4 has first and second cylindrical shaft portions 4a and 4b erected on the same line. The first shaft portion 4a rotatably and slidably supports the first lever member 5, and the second shaft portion 4b rotatably supports the second lever member 6. Further, a pair of spring receiving portions 4c and a pair of spring receiving portions 4d are provided in the vicinities of four corners of the intermediate support member 4. Both ends of the first elastic member 7 are locked to the pair of spring receiving portions 4c, and both ends of the second elastic member 8 are locked to the pair of spring receiving portions 4d. The intermediate support member 4 has an opening 4e, into which a cam engagement portion 5c of the first lever member 5 is inserted, and a notched portion 4f into which a receiving portion 10c of the movable member 10 is inserted. Further, both of the first and second elastic members 7 and 8 are plate springs formed of a thin metal plate.

The first and second lever members 5 and 6 are formed of synthetic resin. Both the lever members 5 and 6 are connected to each other by engaging a connection pin 6d with a long hole 5a. As the first shaft portion 4a is inserted into the long hole 5a, the first lever member 5 is rotatably and slidably supported by the intermediate support member 4. Further, the first lever member 5 has an abutting portion 5b provided on one longitudinal end thereof and a cam engagement portion 5c erected in the other longitudinal end thereof. Further, as the first elastic member 7 is pressed against a planar surface 5d of the first lever member 5 in the other longitudinal end side, the first lever member 5 elastically biases the abutting portion 5b in a direction where the abutting portion 5b projects to the outside of the intermediate support member 4. The cam engagement portion 5c of the first lever member 5 comes in sliding contact with a cam surface 10b of the movable member 10, which will be described below. When the movable member 10 is located at the neutral portion, the top portion of the cam surface 10b pushes the cam engagement portion 5c to the inside of the housing against the biasing force of the first elastic member 7.

Meanwhile, the second lever member 6 has an attachment hole 6a, an opening 6b, and a notch 6c provided therein. As the second shaft portion 4b is inserted into the attachment hole 6a, the second lever member 6 is rotatably supported by the intermediate support member 4. The second lever member 6 has a connection pin 6d projecting on one longitudinal end thereof, and both of the lever members 5 and 6 overlap each other in a state where the connection pin 6d is slidably inserted into and linked with the long hole 5a of the first lever member 5. Further, a pair of operating arms 6e are provided in both sides of the notch 6c in the other longitudinal end of the second lever member 6, and the second elastic member 8 is abutted on the planar surface 6f of the operating arms 6e. Therefore, when the second lever member 6 is rotated from the neutral position, a restoring force is applied by the second elastic member 8.

The control lever 3 is formed of synthetic resin and has a base portion 3a and a lever portion 3b. The base portion 3a is inserted into an opening 9a of the holder 9, and the leading end portion of the first operating member 11 held by the base portion 3a comes in elastic contact with a cam portion (not shown) in the holder 9. Further, shaft holes 3c are formed in side walls of the base portion 3a facing each other, and a shaft 21 is inserted into the shaft holes 3c. As will be described below, the shaft 21 is held in a state where the shaft 21 is inserted into a bearing hole 9e of the holder 9 outside the respective shaft holes 3c and is retained by the holder 9. Therefore, with the shaft 21 being set to a rotating shaft, the control lever 3 is rotatably supported by the holder 9. Further, a driving projection 20 extending toward the printed board is attached to the base portion 3a of the control lever 3, and the driving projection 20 is engaged with a switch portion (not shown) on the printed circuit board. Therefore, when the control lever 3 is tilted with the shaft 21 set to a rotating shaft, the driving projection 20 drives the switch portion such that beam switching or passing operation is performed.

The shaft 21 is formed of metal and has a head 21a formed at one end thereof, the head 21a having a larger diameter than that of the other portion. A ring-shaped concave groove 21b extending in a circumferential direction is formed at the other end thereof, and the other end which is the leading end close to the ring-shaped concave groove 21b is formed in a slightly tapered shape by chamfering the edges thereof. The shaft 21 is inserted into the pair of bearing holes 9e of the holder 9 and the pair of shaft holes 3c of the base portion 3a, and the head 21a and the ring-shaped concave groove 21b are engaged with a side plate 9d or flexible engagement piece 9g (refer to FIG. 6) of the holder 9 such that the shaft 21 is retained. That is, the head 21a has a larger diameter than those of the bearing hole 9e and the shaft hole 3c, and the flexible engagement piece 9g is engaged with the ring-shaped concave groove 21b. Therefore, the shaft 21 which passes through the base portion 3a so as to be inserted into the bearing hole 9e of the holder 9 is held in a state where the shaft 21 is retained by the holder 9. Further, when the shaft 21 is attached in such a manner, the end of the shaft 21 opposite the head 21a is first inserted into the bearing hole 9e and the shaft hole 3c, as shown in FIG. 5. When the leading end of the shaft 21 is abutted on the flexible engagement piece 9g, the shaft 21 may be strongly pressed so as to deflect the flexible engagement piece 9g. Accordingly, when the leading end of the shaft 21 passes through the flexible engagement piece 9g, the deflection of the flexible engagement piece 9g is released in such a manner that the flexible engagement piece 9g is fitted into the ring-shaped concave groove 21b, as shown in FIG. 6. Therefore, the shaft 21 can be simply snapped to the holder 9.

The first operating member 11 is composed of a driving body 12, a coil spring 13, and a rotating member 14. The rotating member 14 is attached on the leading end of the driving body 12, which is biased by the coil spring 13, and thereby, the rotating member 14 comes in elastic contact with a cam portion (not shown) in the holder 9. Further, when the control lever 3 is tilted with the shaft 21 set to the axis of rotation, the rotating member 14 is moved along the cam portion of the holder 9, because the first operating member 11 is interlocked.

The holder 9 is formed of synthetic resin and has an opening 9a into which the base portion 3a of the control lever 3 is inserted. Behind the opening 9a, the cam portion is provided, with which the rotating member 14 comes in sliding contact. The pair of side plates 9d of the holder 9 facing each other through the opening 9a respectively have the bearing hole 9e into which the shaft 21 is inserted. One of the side plates 9d has a tubular portion 9f projecting outward in a thickness direction thereof and the flexible engagement piece 9g extending inward in a radial direction of the bearing hole 9e from the leading end of the tubular portion 9f. The flexible engagement piece 9g is formed of a ring-shaped thin piece which can be engaged with the ring-shaped concave groove 21b of the shaft 21, and the outer peripheral portion of the flexible engagement piece 9g is connected to the leading end of the tubular portion 9f. As described above, as the shaft 21 passing through the base portion 3a of the control lever 3 is snapped to the holder 9, the base portion 3a is supported by the holder 9. Further, the holder 9 has a support shafts 9b and 9c projecting thereon, and the support shafts 9b and 9c are fitted into the bearing portions 1a and 2a of the first and second cases 1 and 2 such that the holder 9 is supported by both of the cases 1 and 2. However, the axial direction of the support shafts 9b and 9c is set to substantially cross the axial direction of the shaft 21 at right angles. Accordingly, with the support shafts 9b and 9c being set to a rotating shaft, the control lever 3 can be tilted integrally with the holder 9 along one plane, with respect to both of the cases 1 and 2. Further, with the shaft 21 being set to a rotating shaft, the control lever 3 can be tilted along the other plane, which substantially crosses the one plane at right angles, with respect to both of the cases 1 and 2 and the holder 9.

The second operating member 15 is held by the end of the holder 9 opposite the opening 9a. The second operating member 15 is composed of a driving body 16, a coil spring 17, and a rotating member 18. The rotating member 18 is attached to the leading end of the driving body 16, which is biased by the coil spring 17, and thereby, the rotating member 18 comes in elastic contact with the cam portion 1b within the first case 1. Further, as the control lever 3 is tilted with the support shafts 9b and 9c set to a rotating shaft, the rotating member 18 is moved along the cam portion 1b, because the holder 9 and the second operating member 15 are interlocked.

The holder 9 has the movable member 10 attached thereon in a state where the movable member 10 is allowed to slightly swing. The movable member 10 is formed of synthetic resin and has a spring lock portion 10a provided in one side. One end of a torsion coil spring 19 is locked to the spring lock portion 10a, and the other end thereof is locked to the holder 9. Therefore, the movable member 10 is swingably supported by the holder 9 through the elasticity of the torsion coil spring 19. Further, the movable member 10 has the cam surface 10b formed in a mountain shape, and the cam engagement portion 5c of the first lever member 5 passing through the opening 4e of the intermediate support member 4 comes in sliding contact with the cam surface 10b. Further, the movable member 10 has the receiving portion 10c projecting thereon, the receiving portion 10c being disposed inside the notch 6c of the second lever member 6. When the control lever 3 is tilted to a lock position with the support shafts 9b and 9c set to a rotating shaft, the receiving portion 10c is moved to a position where it is abutted on the operating arm 6e of the second lever member 6, as shown in FIG. 4. During a cancel operation, the receiving portion 10c is pushed back in the returning direction by the operating arm 6e.

When the turn signal switching device having the above-described construction is assembled, the base portion 3a of the control lever 3 having the first operating member 11 built therein is inserted into the opening 9a of the holder 9 such that the shaft hole 3c and the bearing hole 9c face each other. Then, the end of the shaft 21 at the ring-shaped concave groove 21b is inserted into the bearing hole 9e formed in the side where the tubular portion 9f is not provided, and the flexible engagement piece 9g is deflected as described above. Then, as the flexible engagement piece 9g is fitted into the ring-shaped concave portion 21b, the shaft 21 is snapped to the holder 9. As such, after the holder 9 and the base portion 3a of the control lever 3 are rotatably connected to each other through the shaft 21, the movable member 10 biased by the torsion coil spring 19 is attached to the holder 9, and the second operation member 15 is assembled into the holder 9 such that the support shaft 9b of the holder 9 is inserted into the bearing portion 1a of the first case 1.

Next, the intermediate support member 4 having the first and second elastic members 7 and 8 arranged thereon is attached to the first case 1. FIG. 1 illustrates such a state. In this state, the cam surface 10b of the movable member 10 protrudes in the opening 4e of the intermediate support member 4, and the receiving portion 10c of the movable member 10 projects through the notched portion 4f of the intermediate support member 4.

Next, the first and second lever members 5 and 6 are arranged on the intermediate support member 4. That is, the first shaft portion 4a of the intermediate support member 4 is inserted into the long hole 5a of the first lever member 5 such that the first elastic member 7 is pressed against the planar surface 5d of the first lever member 5, and simultaneously, the cam engagement portion 5c passes through the opening 4e of the intermediate support member 4 so as to be engaged with the cam surface 10b of the movable member 10. Accordingly, the first lever member 5 is elastically biased by the first elastic member 7. However, when the movable member 10 is located at the neutral position, the top portion of the cam surface 10b presses the cam engagement portion 5c into the housing against the biasing force of the first elastic member 7. Therefore, the positional relationship among the first lever member 5, the first elastic member 7, and the intermediate support member 4 at the assembling stage is maintained in a state shown in FIG. 3. Further, after the first lever member 5 is assembled, the connection pin 6d of the second lever member 6 is inserted into the long hole 5a, and the second shaft portion 4b of the intermediate support member 4 is inserted into the attachment hole 6a of the second lever member 6. Then, the second lever member 6 is assembled so as to overlap the first lever member 5. Accordingly, the receiving portion 10c of the movable member 10 is disposed in the notch 6c of the second lever member 6, and the planar surface 6f of the operating arm 6e is abutted on the second elastic member 8. Therefore, the second lever member 6 is held at the neutral position by the biasing force of the second elastic member 8.

Finally, the second case 2 is disposed on the intermediate support member 4 so as to cover the first and second lever members 5 and 6, and the support shaft 9c of the holder 9 is inserted into the bearing portion 2a of the second case 2. Further, as the second case 2 is fixed to the first case 1 through an attachment screw 22, the intermediate support member 4 is interposed between both of the cases 1 and 2, and the assembling operation is completed.

Next, the operation of the turn signal switching device will be described. When the control lever 3 is located at the neutral position, the leading end of the second operating member 15 comes in elastic contact with a valley portion of the cam portion 1b within the first case 1. Therefore, the control lever 3 is held at the neutral position. At this time, the cam engagement portion 5c of the first lever member 5 is abutted on the top portion of the cam surface 10b of the movable member 10 such that the position thereof is restricted. Therefore, as shown in FIG. 3, the projection amount of the first lever member 5 to the outside is suppressed against the biasing force of the first elastic member 7, and the abutting portion 5b is positioned outside the rotational locus of a cancel projection 30 which is rotated with a steering wheel of a vehicle.

When the control lever 3 located at the neutral position is tilted in any one of right and left direction indication positions with the support shafts 9b and 9c set to a rotating shaft, the leading end of the second operating member 15 slides on the cam portion 1b within the first case 1 so as to generate click feeling and is then held by the lock portion. Simultaneously, the holder 9 and the movable member 10 are rotated at a predetermined angle in the same direction such that the top portion of the cam surface 10b is separated from the cam engagement portion 5c of the first lever member 5. Further, as shown in FIG. 4, the first lever member 5 is moved outward along the long hole 5a by the biasing force of the first elastic member 7 such that the abutting portion 5b enters the rotational locus of the cancel projection 30. In this state, the steering wheel is rotationally controlled in the same direction as the tilt direction of the control lever 3. Therefore, the cancel projection 30 can be abutted on the abutting portion 5b in the reverse direction to an arrow direction of FIG. 4. However, although the cancel projection 30 is abutted on the abutting portion 5b in this direction such that the first and second lever members 5 and 6 are rotated in the counterclockwise direction, the torque thereof is not transmitted to the receiving portion 10c of the movable member 10. Therefore, when the cancel projection 30 passes, both of the lever members 5 and 6 return to the state of FIG. 4.

In this state, however, when the steering wheel is rotationally controlled in the reverse direction to the tilt direction of the control lever 3, the cancel projection 30 is abutted on the abutting portion 5b in the arrow direction of FIG. 4. Therefore, the first and second lever members 5 and 6 are rotated in the clockwise direction. That is, since the first lever member 5 is rotationally driven about the first shaft portion 4a in the clockwise direction, the second lever member 6 is rotated with the rotation of the first lever member 5, and the operating arm 6e pushes the receiving portion 10c of the movable member 10 upward in the drawing. Since the pushing force is transmitted to the holder 9 from the movable member 10, the leading end of the second operating member 15 is separated from the lock portion of the cam portion 1b so as to be pressed back to the valley portion, and both of the lever members 5 and 6 automatically return to the neutral position shown in FIG. 3.

In the state of FIG. 4, when any force preventing the automatic return acts on the control lever 3, for example, when the steering wheel is rotationally controlled in the reverse direction to the tilt direction while the control lever 3 is pressed by the hand, the receiving portion 10c is pressed against the operating arm 6e by a divided force of the torque of the second lever member 6. Therefore, the movable member 10 slightly swings with respect to the holder 9 against the biasing force of the torsion coil spring 19. Further, the first and second lever members 5 and 6 can be rotated without being hindered by the receiving portion 10c.

Meanwhile, when the control lever 3 located at the neutral position is tilted with the shaft 21 set to a rotating shaft, the base portion 3a of the control lever 3 is rotated at a predetermined angle in the same direction with respect to the holder 9. Therefore, the leading end of the first operating member 11 slides on a cam portion (not shown) within the holder 9. As a result, when the control lever 3 is tilted in one direction, click feeling is generated, so that a beam switching operation is performed. When the control lever 3 is tilted in the reverse direction, a passing operation is performed.

In the turn signal switching device according to this embodiment, while the shaft 21 is used for rotatably connect the holder 9, which is supported by the first and second cases 1 and 2 composing the housing, to the base portion 3a of the control lever 3, the shaft 21 is retained by the head 21a and the flexible engagement piece 9g of the side plate 9d of the holder 9, the flexible engagement piece 9g being engaged with the ring-shaped concave groove 21b. Further, the shaft 21 can be snapped to the holder 9 by using the deflection of the flexible engagement piece 9g. Therefore, the attachment operation of the shaft 21 is easily performed, and the retaining member such as a washer or the like does not need to be used. Therefore, although an elastic repulsive force generated by the coil spring 13 or 17 is strengthened to increase control feeling when the control lever 3 is tilted, the connection strength between the holder 9 and the base portion 3a of the control lever 3, which are connected through the shaft 21 formed of metal with excellent rigidity, is not likely to be insufficient.

Further, although the shaft 21 is used, the efficiency of the assembling operation is not degraded. Therefore, it is possible to prevent a cost from increasing.

In this embodiment, since the flexible engagement piece 9g is provided in the tubular portion 9f projecting from the side plate 9d of the holder 9, it is not likely that the side plate 9d is deflected, even though the flexible engagement piece 9g is deflected when the shaft 21 is snapped. Therefore, it is possible to minimize the thickness of the side plate 9d. However, as shown in a modification of FIG. 7, the flexible engagement piece 9g may be directly extended into the bearing hole 9e from the side plate 9d of the holder 9. Further, when slits are provided in a plurality of places of the flexible engagement piece 9g or the tubular portion 9f such that the deflection can be easily performed, the shaft 21 can be easily snapped even though the flexible engagement piece 9g is not formed of a thin piece.

The invention claimed is:

1. A turn signal switch device comprising:
   a control lever that has a lever portion that projects from a base portion that has a shaft hole;
   a shaft that has a head disposed at one end, wherein the head has a larger diameter than that of the other portion of the shaft, and is inserted into the shaft hole so as to serve as a rotating shaft of the control lever;
   a holder that is formed of synthetic resin, has an opening into which the base portion is inserted, and supports the shaft such that the control lever can be tilted along one plane; and
   a case that supports the holder such that the control lever and the holder can be integrally tilted along the other plane which substantially crosses the one plane at right angles,
   wherein a ring-shaped concave groove that extends in a circumferential direction is provided at the other end of the shaft, a bearing hole that has a smaller diameter than that of the head and into which the shaft is inserted is provided in a pair of side plates of the holder that faces each other, and a flexible engagement piece that extends inwardly in a radial direction of the bearing hole so as to be engaged with the ring-shaped groove is provided in one of the pair of side plates.

2. The turn signal switch device according to claim 1, wherein a tubular portion is provided in the side plate that has the flexible engagement piece provided therein, the tubular portion projecting outward in a thickness direction of the side plate so as to continue to the outer peripheral portion of the flexible engagement piece.

3. The turn signal switch device according to claim 2, wherein the shaft is formed of metal.

4. The turn signal switch device according to claim 2, wherein the leading end of the shaft at the other end has a tapered shape.

5. The turn signal switch device according to claim 1, wherein the shaft is formed of metal.

6. The turn signal switch device according to claim 1, wherein the leading end of the shaft at the other end has a tapered shape.

* * * * *